US010152132B2

(12) United States Patent
Belley et al.

(10) Patent No.: US 10,152,132 B2
(45) Date of Patent: Dec. 11, 2018

(54) METHOD AND APPARATUS FOR ENABLING HEAVY FLOATING TOUCHSCREEN HAPTICS ASSEMBLES AND PASSIVE BRAKING SYSTEM

(71) Applicant: Immersion Corporation, San Jose, CA (US)

(72) Inventors: Benoit Paul Belley, San Jose, CA (US); Charles Banter, San Jose, CA (US); Daniel Parker, San Jose, CA (US); Kohei Imoto, Cupertino, CA (US)

(73) Assignee: IMMERSION CORPORATION, San Jose, CA (US)

( * ) Notice: Subject to any disclaimer, the term of this patent is extended or adjusted under 35 U.S.C. 154(b) by 2 days.

(21) Appl. No.: 15/424,012

(22) Filed: Feb. 3, 2017

(65) Prior Publication Data

US 2017/0249011 A1      Aug. 31, 2017

Related U.S. Application Data

(60) Provisional application No. 62/300,722, filed on Feb. 26, 2016.

(51) Int. Cl.
*G06F 3/01* (2006.01)
*B60K 37/00* (2006.01)
(Continued)

(52) U.S. Cl.
CPC .............. *G06F 3/016* (2013.01); *B60K 37/00* (2013.01); *F16F 7/12* (2013.01); *G06F 3/044* (2013.01);
(Continued)

(58) Field of Classification Search
None
See application file for complete search history.

(56) References Cited

U.S. PATENT DOCUMENTS

| 6,289,783 B1 | 9/2001 | Sagaser et al. |
| 6,294,859 B1 | 9/2001 | Jaenker |

(Continued)

FOREIGN PATENT DOCUMENTS

| EP | 2 876 527 A1 | 5/2015 |
| EP | 2 980 982 A1 | 2/2016 |

(Continued)

OTHER PUBLICATIONS

Extended European Search Report issued in EP 17156738.1, dated Aug. 3, 2017.

*Primary Examiner* — Nicholas Lee
(74) *Attorney, Agent, or Firm* — Medler Ferro Woodhouse & Mills PLLC

(57) ABSTRACT

A system for amplifying haptic effects provided by a push-pull actuator includes a housing component, a push-pull actuator coupled to the housing component and configured to provide a force and a displacement, a lever component including a lever arm and a fulcrum, and a haptic touch surface coupled to the lever arm via an output interface. The push-pull actuator is via an actuator mount. The amount of displacement transferred to the haptic touch surface from the push-pull actuator is reduced by the lever component and the amount of force transferred to the haptic touch surface from the push-pull actuator is increased by the lever component. The system may include a material stop coupled to the housing component that when compressed by the haptic touch surface exhibits hysteresis to dampen the haptic touch surface.

19 Claims, 11 Drawing Sheets

(51) Int. Cl.
*F16F 7/12* (2006.01)
*G06F 3/044* (2006.01)
*G06F 3/041* (2006.01)

(52) U.S. Cl.
CPC .... *G06F 3/0414* (2013.01); *B60K 2350/1032* (2013.01); *B60K 2350/405* (2013.01); *B60Y 2400/4026* (2013.01); *F16F 2224/025* (2013.01)

(56) References Cited

U.S. PATENT DOCUMENTS

| | | | |
|---|---|---|---|
| 6,563,487 | B2 | 5/2003 | Martin et al. |
| 7,182,691 | B1 | 2/2007 | Schena |
| 7,283,120 | B2 | 10/2007 | Grant |
| 7,973,769 | B2 | 7/2011 | Olien |
| 8,059,105 | B2 | 11/2011 | Rosenberg et al. |
| 8,506,369 | B2 | 8/2013 | Grant |
| 8,508,486 | B2 | 8/2013 | Grant et al. |
| 8,629,954 | B2 | 1/2014 | Olien et al. |
| 9,213,409 | B2 | 12/2015 | Redelsheimer et al. |
| 2002/0054011 | A1 | 5/2002 | Bruneau et al. |
| 2002/0133174 | A1 | 9/2002 | Charles et al. |
| 2003/0109314 | A1 | 6/2003 | Ku |
| 2004/0137983 | A1 | 7/2004 | Kerr et al. |
| 2005/0231476 | A1 | 10/2005 | Armstrong |
| 2007/0247031 | A1 | 10/2007 | Petersen |
| 2008/0111788 | A1 | 5/2008 | Rosenberg et al. |
| 2009/0085882 | A1 | 4/2009 | Grant et al. |
| 2009/0115292 | A1 | 5/2009 | Ueda et al. |
| 2010/0182263 | A1 | 7/2010 | Aunio et al. |
| 2010/0245254 | A1 | 9/2010 | Olien et al. |
| 2010/0320870 | A1 | 12/2010 | Rahman et al. |
| 2011/0080350 | A1* | 4/2011 | Almalki ............... G06F 3/0414 345/173 |
| 2011/0276878 | A1* | 11/2011 | Sormunen ............ G06F 3/016 715/702 |
| 2013/0194085 | A1 | 8/2013 | Grant et al. |
| 2013/0207927 | A1* | 8/2013 | Pfau ..................... G06F 3/016 345/174 |
| 2014/0315642 | A1 | 10/2014 | Grant et al. |
| 2015/0018101 | A1 | 1/2015 | Schoenith et al. |
| 2015/0133221 | A1 | 5/2015 | Danny |
| 2016/0027263 | A1 | 1/2016 | Parker et al. |
| 2016/0256148 | A1 | 9/2016 | Huffmaster et al. |

FOREIGN PATENT DOCUMENTS

| | | |
|---|---|---|
| GB | 2492968 | 1/2013 |
| WO | 99/17850 A2 | 4/1999 |
| WO | 2014/078902 A1 | 5/2014 |

* cited by examiner

METHOD AND APPARATUS FOR ENABLING HEAVY FLOATING TOUCHSCREEN HAPTICS ASSEMBLES AND PASSIVE BRAKING SYSTEM

CROSS-REFERENCE TO RELATED APPLICATIONS

This application claims the benefit under 35 U.S.C. § 119(e) of the filing date of U.S. Provisional Application No. 62/300,722, Feb. 26, 2016, the contents of which are incorporated by reference herein in their entirety.

FIELD OF THE INVENTION

Embodiments hereof are directed generally to floating touchscreen assemblies and more particularly to components that enable or improve haptic effects on a heavy floating touchscreen assembly.

BACKGROUND OF THE INVENTION

Haptics is a tactile and force feedback technology that takes advantage of a user's sense of touch by applying haptic feedback effects (i.e., "haptic effects"), such as forces, vibrations, and motions, to the user. Devices, such as mobile devices, touchscreen devices, touchpad devices and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, touchpad, lever, joystick wheel, or some other control, the OS of the device can send a play command through control circuitry to the embedded hardware. The embedded hardware then produces the appropriate haptic effect.

In an automotive environment, haptics can provide tactile feedback to help create a more confident and safe user experience in an automotive environment. Automotive applications of haptics have included rotary knobs, joysticks, touchpads and touchscreens. The use of touchscreens in the automotive environment is increasing. Touchscreens are a natural interface for navigation systems, and tactile feedback improves the overall touchscreen usability as well as specific features of the navigation system human-machine interface. Users experience more intuitive interactions, reduced glance time for improved safety, and space-saving designs. The touchscreen buttons deliver a tactile pulse the user can actually feel through the touchscreen, since the touchscreen is mounted on a suspension that permits movement of the touchscreen, allowing the user to select an icon with a quick glance and touch of the touchscreen. Furthermore, with the use of proximity-sensing technology, a hand can be detected as it approaches the touchscreen. When the icon is pressed, the touchscreen pulses to acknowledge the command, allowing one to keep their eyes safely on the road. Thus the physical feedback of a haptic touchscreen or touchpad allows the driver to operate the system without looking at the touchscreen or pad. The Cadillac CUE and the Acura RLX On-Demand Multi-Use Display™ are two automotive haptic touchscreen applications. The Lexus NX utilizes a haptic touchpad application.

The touchscreens used in the automotive environment are large displays and can be heavier than other haptic touchscreens. For example, a 10-inch display may be desired and can weigh around 500 g since the system may include a LCD secured to the touch panel by optical bonding for better visibility. The touchscreen or panel may be referred to as a floating screen, as it is mounted on a suspension system to allow the touchscreen to move as the haptic effects are generated. To provide haptics to a floating system device, low travel or motion and high force for acceleration is required. As moveable masses, such as the touchscreen and its assembly, become larger and/or heavier, the force required rises above what cost effective solenoids or push-pull actuators can provide. As a result, multiple solenoids or push-pull actuators have been needed to produce this required force which is not cost effective and takes up too much real estate. Thus there is a need for an actuator amplification mechanism that can move heavy moveable masses with a greater force to generate the required displacement and acceleration needs.

Another issue in current actuation technology is the need for a more efficient and cost effective braking mechanism. Currently braking can be done through the process of active braking. This is done by sending a reverse signal to the same actuator that was used to move the mass initially. However, the problem with this method is that it is very difficult to implement due to the measurement requirements needed to send an accurate reverse signal. Not only are the measurements and calculations very difficult to obtain, but the braking force that is created is limited by the strength of actuator and its capabilities. As a result, this only creates a limited braking force which will permit the moveable mass to continue moving or oscillating before coming to a complete rest.

Others have also tried to solve this problem through passive friction braking. This is accomplished where a material attached to the fixed mass is pressed onto a material attached to the moveable mass, causing a friction force that opposes travel as the moveable mass moves in relation to the grounded mass. This causes the moveable mass to decelerate once the actuation force is removed. The friction between these two materials is controlled by the force applied normal to the friction surface and by the static and dynamic friction coefficient of the two materials rubbing against each other. However this also can be very difficult to implement because friction needs to be applied to the moveable mass, and this friction force can drastically vary with the force applied normal to the surface. Further, this solution can be difficult to implement because it requires the use of a stronger actuator because the friction force is always opposing motion throughout the duration of the haptic effect. Thus there is also a need for a braking mechanism that can provide more effective braking that does not have such limitations.

BRIEF DESCRIPTION OF THE INVENTION

Embodiments hereof relate to systems for amplifying haptic effects provided by a push-pull actuator. According to an embodiment hereof, the system includes a push-pull actuator configured to provide a force and a displacement and an actuator amplification apparatus. The actuator amplification apparatus includes an actuator mount configured to attach the actuator amplification apparatus to a housing component, a lever component including a lever arm and a fulcrum, and an output interface coupled to the lever arm and configured to attach the actuator amplification apparatus to a moveable mass. The push-pull actuator is disposed within the actuator mount. The lever arm has a first end coupled to the push-pull actuator to receive the force from the push-pull actuator and a second opposing end coupled to the fulcrum. The lever is configured to pivot on the fulcrum upon receiving the force from the push-pull actuator. The lever component transfers and reduces the displacement provided by the push-pull actuator to the moveable mass, and the lever component also transfers and amplifies the force provided by the push-pull actuator to the moveable mass.

According to another embodiment hereof, a system includes a housing component, a push-pull actuator configured to provide a force and a displacement, a lever component including a lever arm and a fulcrum, and a haptic touch surface coupled to the lever arm via an output interface. The push-pull actuator is coupled to the housing component via an actuator mount. The lever arm has a first end coupled to the push-pull actuator to receive the force from the push-pull actuator and a second opposing end coupled to the fulcrum so that the lever is configured to pivot on the fulcrum upon receiving the force from the push-pull actuator. The amount of displacement transferred to the haptic touch surface from the push-pull actuator is reduced by the lever component and the amount of force transferred to the haptic touch surface from the push-pull actuator is increased by the lever component.

According to another embodiment hereof, a system includes a housing component, a moveable mass coupled to the housing component to be moveable relative thereto, an actuator configured to provide a force to move the moveable mass relative to the housing component, and a material stop coupled to the housing component. The material stop is configured to dampen the moveable mass when the moveable mass contacts the material stop. The material stop compresses when the moveable mass contacts the material stop and the compressed material stop exhibits hysteresis to dampen the moveable mass.

BRIEF DESCRIPTION OF DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

Specific embodiments of the present invention are now described with reference to the figures, wherein like reference numbers indicate identical or functionally similar elements. The following detailed description is merely exemplary in nature and is not intended to limit the invention or the application and uses of the invention. Furthermore, there is no intention to be bound by any expressed or implied theory presented in the preceding technical field, background, brief summary or the following detailed description. Furthermore, although embodiments described herein are primarily directed to an actuator amplification apparatus for use with heavy floating touchscreen assemblies, those skilled in the art would recognize that the description applies equally to other moveable masses. Embodiments of actuator amplification apparatuses illustrated herein are described within the context of a touchscreen wherein a graphical display is disposed behind a touch surface or touch element. It will be understood, however, that the invention is not limited to actuator amplification apparatuses for such touchscreens but is equally applicable to any haptically excited touch surface or touch element. For example, the actuator amplification apparatus might be applied to the touchpad of a computer wherein the display screen is not co-located with the touchpad. It may be applied to a touch element with at least one touch sensitive region or an array of touch sensitive regions that may be created by capacitive sensors, near field effect sensors, piezo sensors, or other sensor technology. The graphical element may be a display located behind or in a separate location from the touch element and updated by a host computer, or it may simply be a plastic surface with features (e.g. graphics) indicating touch sensitive regions of an associated touch element. Thus, the term haptic touch surface when used in the following detailed description and in the claims should be construed to encompass traditional touchscreens as well as any touch surface or touch element and associated graphical element to which haptic effects may be applied.

Figure 1:
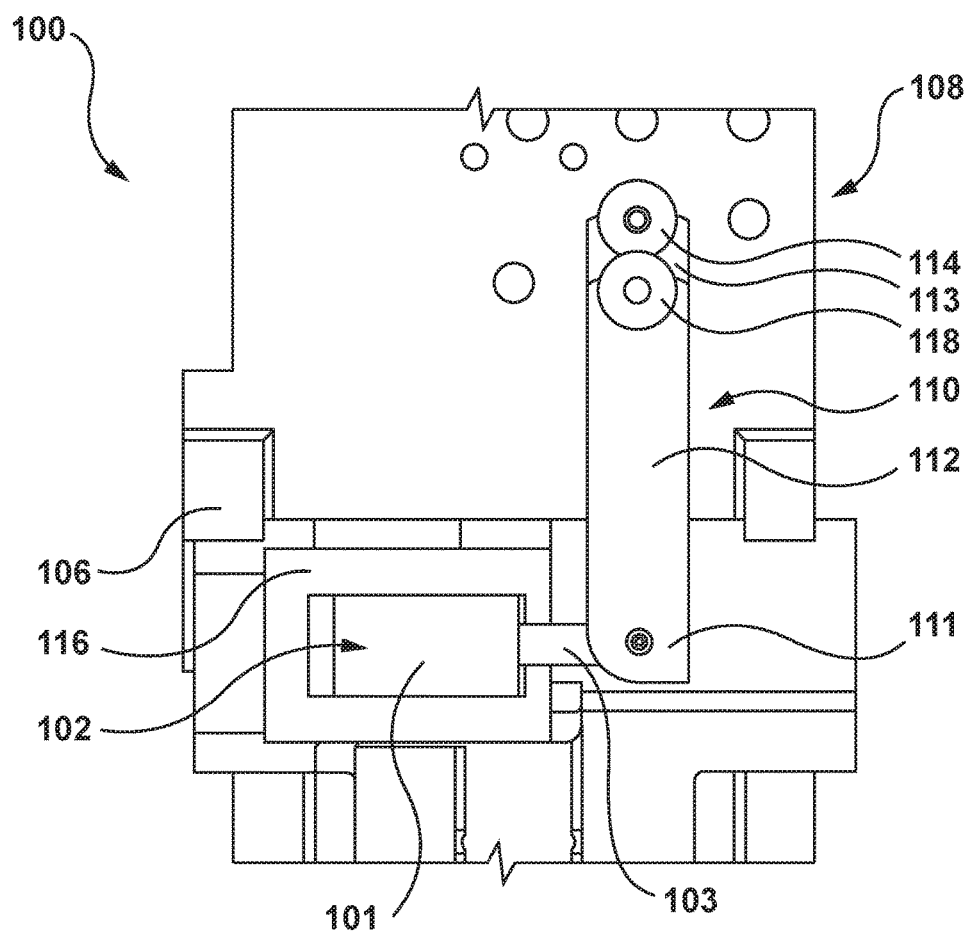
FIG. 1 is a top view of an actuator amplification apparatus according to an embodiment hereof, wherein the actuator amplification apparatus includes a lever component including a lever arm and a fulcrum, the lever component being configured to transfer and reduce the displacement provided by a push-pull actuator to a moveable mass, and also configured to transfer and amplify the force provided by the push-pull actuator to the moveable mass.
Figure 2:
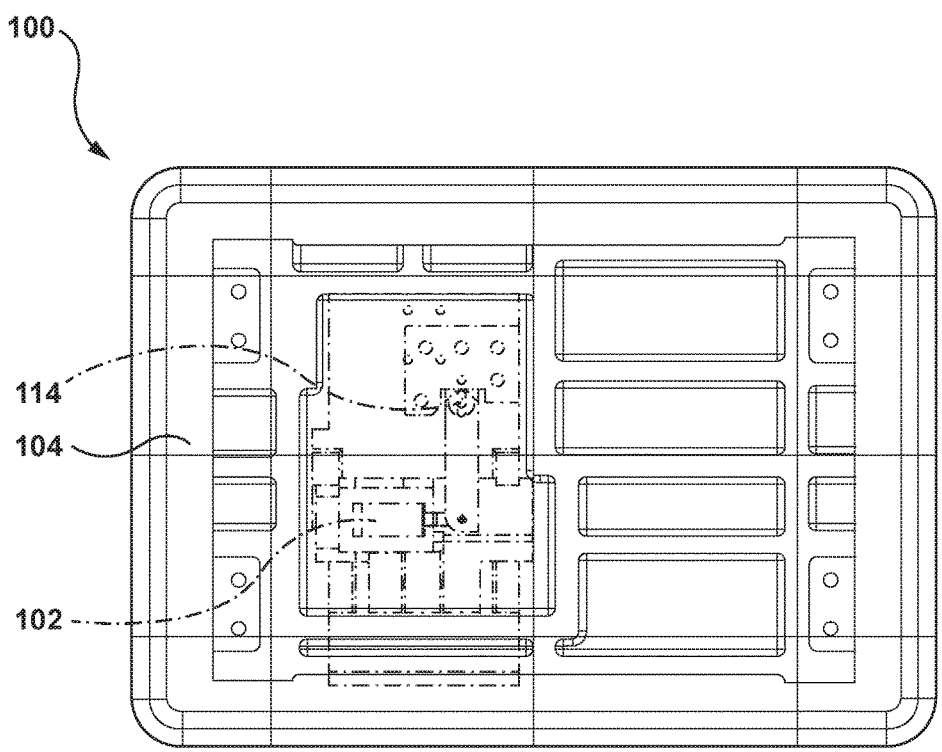
FIG. 2 is a top view of the actuator amplification apparatus of FIG. 1 with the moveable mass disposed thereover and coupled thereto.

FIG. 1 is a top view of a system 100 for amplifying haptic effects provided by a solenoid or push-pull actuator 102. System 100 includes an actuator amplification apparatus 108 according to an embodiment hereof, and FIG. 1 illustrates actuator amplification apparatus 108 coupled to a portion of a fixed mass or housing component 106. FIG. 2 is a top, zoomed out view of a moveable mass or haptic touch surface 104 disposed over housing component 106 such that actuator amplification apparatus 108 is encapsulated within or disposed between housing component 106 and haptic touch surface 104. As will be explained in more detail herein, actuator amplification apparatus 108 includes a lever component 110 with a lever arm 112 and a fulcrum 114. Lever component 110 is configured to transfer and reduce the displacement provided by push-pull actuator 102 to haptic touch surface 104, and is also configured to transfer and amplify the force provided by push-pull actuator 102 to haptic touch surface 104. Stated another way, lever component 110 receives the high travel/low force provided by push-pull actuator 102 and converts it to low travel/high force through the use thereof. By mechanically modifying or increasing the output force of push-pull actuator 102, lever component 110 enables heavy floating touchscreens and touch surface haptics assemblies through the use thereof. Lever component 110 can be designed for individual force requirements or for any standard push-pull actuator. Lever component 110 is designed to impart a force that is only limited by the output force of the actuator and the haptic requirements of the design.

More particularly, with reference to FIG. 1, actuator amplification apparatus 108 includes an actuator mount 116 configured to attach push-pull actuator 102 to housing component 106, lever component 110, and an output interface 118 configured to attach lever component 110 to haptic touch surface 104. Actuator mount 116 is attached to or integrally formed with housing component 106, and is configured to receive push-pull actuator 102 therein or thereon to thereby couple push-pull actuator 102 to housing component 106. In an embodiment hereof, housing component 106 is a dashboard frame of an automobile and haptic touch surface 104 is a touchscreen that is configured to move relative to housing component 106. In an embodiment, haptic touch surface 104 weighs between 200 grams and 2000 grams. Housing component 106 is a stationary component meaning that it is not intended or configured to be moved via push-pull actuator 102, and in an embodiment hereof is a casing that at least partially encloses and protects components of system 100. However, housing component 106 may be any type of fixed or grounded mass and haptic touch surface 104 may be any type of moveable mass. The term "fixed mass" as used herein includes a stationary component that is not intended or configured to be moved via push-pull actuator 102, while the term "moveable mass" as used herein includes a component that is intended or configured to be moved via push-pull actuator 102 relative to a fixed mass.

Lever component 110 extends between actuator mount 116 (coupled to fixed mass or housing component 106) and output interface 118 (coupled to moveable mass or haptic touch surface 104). Lever arm 112 of lever component 110 has a first end 111 coupled to push-pull actuator 102 to receive a force therefrom and an opposing second end 113 coupled to fulcrum 114 of lever component 110. Fulcrum 114 is attached to a portion of housing component 106. More particularly, a body 101 of push-pull actuator 102 is disposed within or on actuator mount 116 and first end 111 of lever arm 112 is coupled to a plunger 103 of push-pull actuator 102. Output interface 118, which may be for example a pin, is coupled to lever arm 112 adjacent to second end 113 thereof and is attached to haptic touch surface 104. As used herein, "adjacent" to second end 113 includes that output interface 118 is directly beside or only slightly spaced apart from fulcrum 114 such that output interface 118 does not interfere with the operation of fulcrum 114. Haptic touch surface 104 is not directly attached to housing component 106 but rather is only directly attached to output interface 118.

Figure 3:
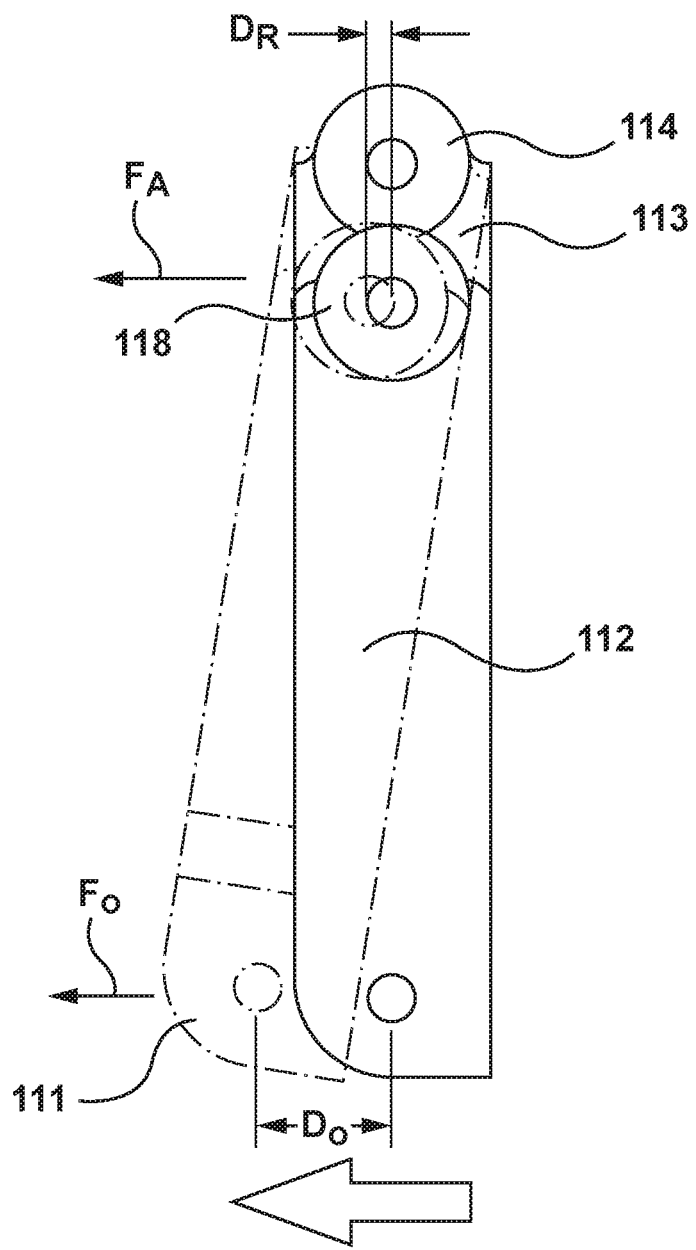
FIG. 3 is an enlarged view of the lever component of FIG. 1 to illustrate the operation thereof, the lever component being removed from the actuator amplification apparatus for illustrative purposes only.

FIG. 3 is an enlarged view of lever component 110 to illustrate the operation and movement thereof, lever component 110 being removed from actuator amplification apparatus 108 for illustrative purposes only. Push-pull actuator 102 is configured to provide or output a force $F_o$ and a displacement $D_o$. In the exemplary embodiment, push-pull actuator 102 is providing a pull force on first end 111 of lever arm 112, which results in first end 111 of lever arm 112 being moved or traveling the length of displacement $D_o$. Lever component 110 is configured to pivot on fulcrum 114 upon receiving force $F_o$ from push-pull actuator 102. More particularly, when first end 111 of lever arm 112 is moved in the pull direction, lever component 110 pivots along fulcrum 114 in a clockwise direction. The movement of lever component 110 causes output interface 118 (which is coupled to lever arm 112 adjacent to second end 113 thereof) to also move and as a result move haptic touch surface 104 which is coupled to output interface 118. Output interface 118 moves in a similar pull direction but the distance moved by output interface 118 is much smaller than the distance moved by first end 111 of lever arm 112. As shown on FIG. 3, output interface 118 and haptic touch surface 104 coupled thereto moves or travels the length of a reduced displacement DR rather than displacement $D_o$. Lever component 110 thus transfers and reduces the displacement provided by push-pull actuator 102 to haptic touch surface 104. Stated another way, the amount of displacement transferred to haptic touch surface 104 from push-pull actuator 102 is reduced by lever component 110. In an embodiment hereof, reduced displacement DR is on a micrometer level although it will be understood that the amount of reduced displacement DR depends on the amount of force $F_o$ from push-pull actuator 102, the dimensions of lever component 110, and the position of fulcrum 114.

Due to mechanical advantage, lever component 110 also transfers and amplifies force $F_o$ provided by push-pull actuator 102 to haptic touch surface 104. Stated another way, the amount of force transferred to haptic touch surface 104 from push-pull actuator 102 is increased by lever component 110. More particularly, lever component 110 preserves the input power from push-pull actuator 102 and trades off forces against movement to obtain a desired amplification in the output force. The power into and out of lever component 110 must be the same, and power is the product of force and velocity. As lever component 110 pivots on fulcrum 114, first end 111 of lever arm 112 is further away from fulcrum 114 than second end 113 of lever arm 112 and thus first end 111 moves faster than second end 113. Thus, force $F_o$ applied to first end 111 of lever arm 112 will be amplified or increased at second end 113 of lever arm 112 to an amplified force $F_A$. Amplified force $F_A$ is then transferred from output interface 118 to haptic touch surface 104 to cause the required acceleration profile. As such, lever component 110 operates to multiply the output force of push-pull actuator 102 (force $F_o$) by a mechanical advantage, thus resulting in a new output force (amplified force $F_A$) and output travel (reduced displacement DR) of push-pull actuator 102 and lever component 110 combined together, as compared to push-pull actuator 102 alone. Lever component 110 modifies the output force of push-pull actuator 102 and the travel of plunger 103 of push-pull actuator 102.

Displacement $D_o$ and reduced displacement DR may be considered different input and output levers, respectively, of lever component 110. Similarly, force $F_o$ and amplified force $F_A$ may be considered different input and output forces, respectively, at the input and output levers, respectively. Force $F_o$ is input at the input lever, and amplified force $F_A$ is at the output lever. Amplified force $F_A$ is multiplied by the mechanical advantage of lever component 110.

Accordingly, actuator amplification apparatus 108 amplifies a force provided or output by push-pull actuator 102 to haptic touch surface 104. Actuator amplification apparatus 108 can amplify force at a desired ratio without limitations. For example, the ratio can be 0.001 to 1 or 1,000 to 1, with the only modification needed being the location of the output interface. The present invention requires only a single lever component 110, and actuator amplification apparatus 108 enables haptics on larger or heavier form factors with the size limitation being only restricted to the actuator capabilities and the required haptic effect. However, although described as being utilized with a single push-pull actuator, it will be understood by one of ordinary skill in the art that actuator amplification apparatuses described herein may be used with multiple actuators depending upon the desired or requisite output force of the system.

Figure 4:
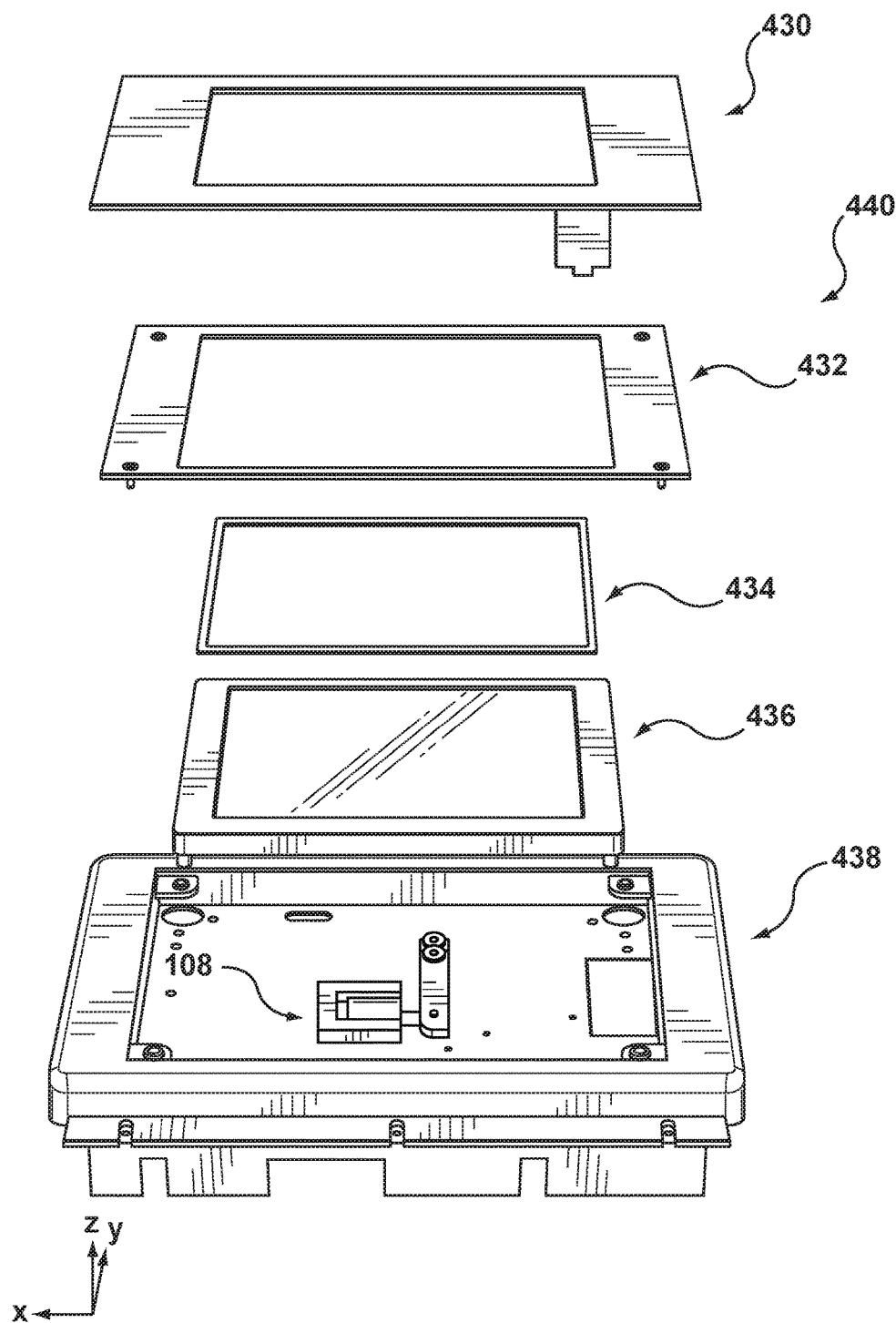
FIG. 4 is an exploded perspective view of a haptic device with the actuator amplification apparatus of FIG. 1 incorporated therein.

FIG. 4 is an exploded perspective view of various components of a haptic device 440 with actuator amplification apparatus 108 incorporated therein. Haptic device 440 provides haptic feedback to a touchscreen 430. In addition to touchscreen 430, haptic device 440 includes a carrier 432, push-pull actuator 102 for providing a haptic effect to a user of touchscreen 430, a dust seal 434, an LCD component 436, and a housing component 438. Touchscreen 430 and housing component 438 are coupled together such that touchscreen 430 is movable relative to housing component 438. Stated another way, at least touchscreen 430 is a moveable mass and housing component 438 is a fixed mass. Other components of haptic device 440 may be coupled to touchscreen 430 and move concurrently therewith, depending upon the size, positioning, and particular configuration of the components. For example, in one embodiment, carrier 432, dust seal 434, LCD component 436 and touchscreen 430 may be coupled together such that these components are collectively considered a moveable mass. Carrier 432 may be formed from a sheet metal such as steel or aluminum, or a plastic material such as polycarbonate or PC-ABS. Actuator amplification apparatus 108 is attached to at least one component of the moveable mass via output interface 118 described above such that output interface 118 is coupled to touchscreen 430. The size and positioning of actuator amplification apparatus 108 may vary from that shown in FIG. 4 depending upon the desired positioning of output interface 118 for attachment to the moveable mass. In another embodiment, carrier 432 and touchscreen 430 may be coupled together such that carrier 432 and touchscreen 430 are collectively considered a moveable mass. When carrier 432 and touchscreen 430 are collectively a moveable mass, LCD component 436 is coupled to housing component 438 in any suitable manner with dust seal 434 installed to prevent dust intrusion between touchscreen 430 and LCD component 436. Housing component 438 is generally considered to be a compartment or casing, but may be any type of base component. In an embodiment, haptic device 440 may be a medical device with a seven inch touchscreen display, for instance. Haptic device 440 may be any of a number of devices having an automotive interface (i.e., touchscreen, touchpad, or touch panel) such as, for instance, a computer, cellular telephone, PDA, portable gaming device, media player, a printer, an office telephone, or the like. Software is used to provide haptic feedback to the user of haptic device 440. In an embodiment, touchscreen 430 can display a graphical environment based on application programs and/or operating systems that are running, such as a graphical user interface (GUI). The graphical environment may include, for example, backgrounds, windows, data listings, a cursor, icons such as buttons, and other graphical objects well known in GUI environments. A user interacts with haptic device 440 by touching various regions of touchscreen 430 to activate, move, flip, advance, or otherwise manipulate the virtual graphical objects displayed on the screen, and thereby to provide inputs to the device. Such touchscreens and GUIs are well known, as exemplified in U.S. Pat. No. 8,059,105 to Rosenberg et al. incorporated by reference above.

Touchscreen 430 of haptic device 440 may be considered a haptic touchscreen in that haptic device 440 is provided with push-pull actuator 102 and associated control hardware and software that provide signals to push-pull actuator 102 causing it to induce desired motion of touchscreen 430 in coordination with the user's touches. A signal may be provided to, for example, induce a jolt in conjunction with a virtual button press or collisions between virtual elements, or vibrations in conjunction with movement of virtual elements across the screen, or other types of screen movements as described in more detail in U.S. Pat. No. 8,059,105 to Rosenberg et al. incorporated by reference above. Such haptic feedback or effects, also known as tactile feedback, touch feedback, and vibro-tactile feedback, allows for a more intuitive, engaging, and natural experience for the user of haptic device 440 and thus interaction between the user and haptic device 440 is considerably enhanced through the tactile feedback provided by the haptic effects.

Figure 4A:
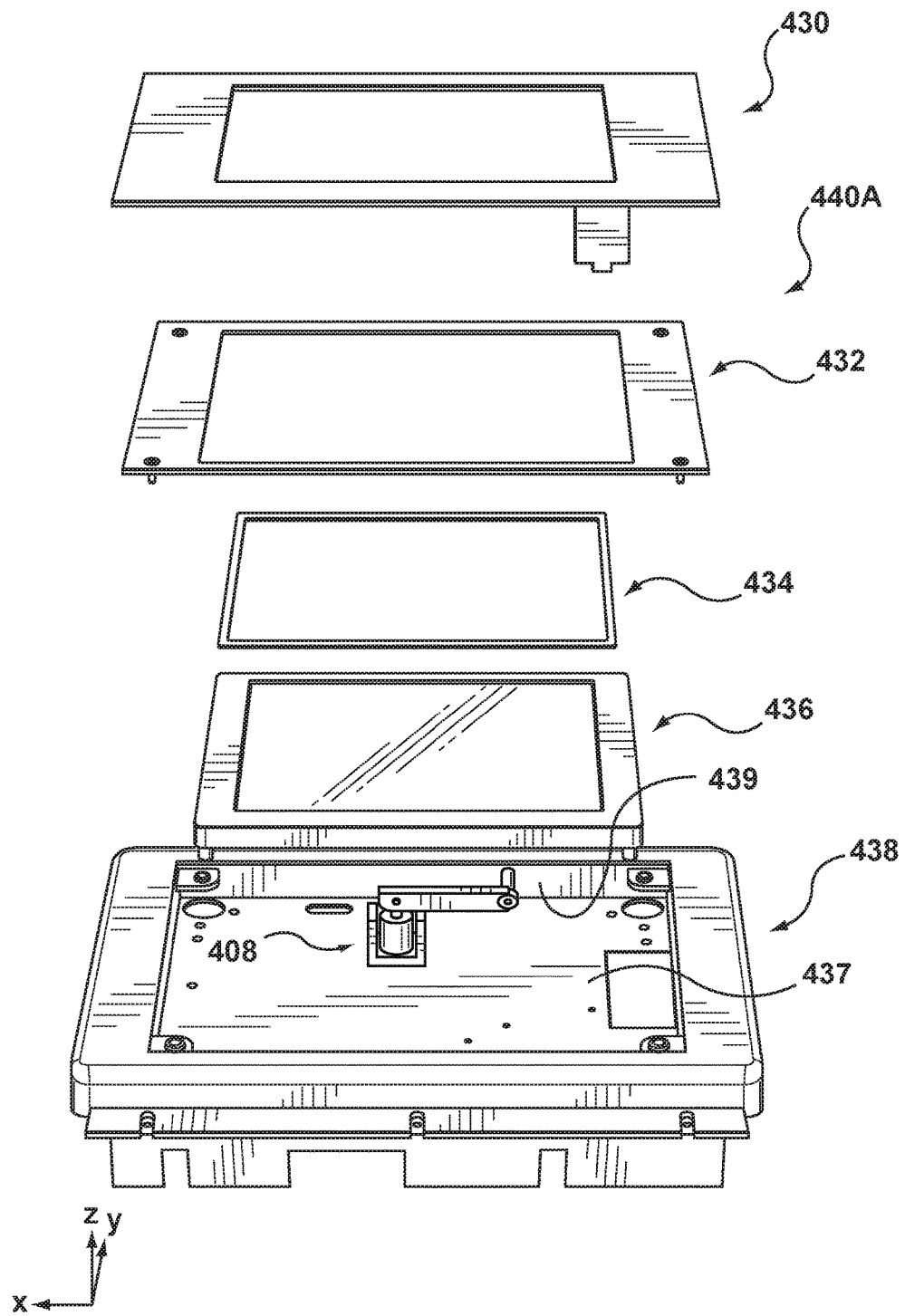
FIG. 4A is an exploded perspective view of a haptic device with an actuator amplification apparatus according to another embodiment hereof, wherein the actuator amplification apparatus is oriented within the haptic device such that the amplified force provided or output thereby is in an upward and/or downward direction along the z-axis.
Figure 4B:
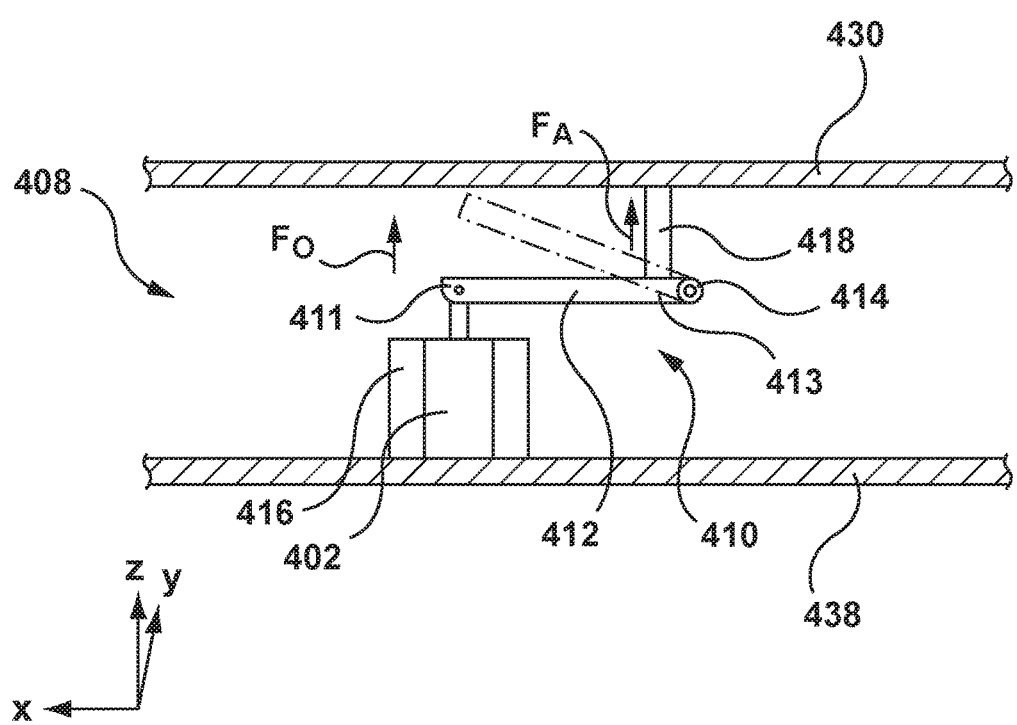
FIG. 4B is a side view illustration of the actuator amplification apparatus of FIG. 4A disposed between a touchscreen and a housing component of the haptic device of FIG. 4A to illustrate the operation thereof.

In the embodiment of FIG. 4, haptic device 440 is configured to permit or allow lateral motion or displacement of touchscreen 430. Stated another way, actuator amplification apparatus 108 is oriented within haptic device 440 such that push-pull actuator 102 moves touchscreen 430 in a side-to-side manner along the x-axis. However, according to another embodiment hereof, the push-pull actuator and the actuator amplification apparatus may be configured to move a touchscreen or haptic touch surface in an up-down manner along the z-axis. More particularly, FIG. 4A is an exploded perspective view of various components of a haptic device 440A. Haptic device 440A includes the same components as haptic device 440, except that haptic device 440A includes a push-pull actuator 402 and an actuator amplification apparatus 408 oriented within haptic device 440A such that the amplified force provided or output by actuator amplification apparatus 408 is in an upward and/or downward direction along the z-axis. More particularly, FIG. 4B is a side view illustration of actuator amplification apparatus 408 to illustrate the operation thereof. For sake of clarity only, carrier 432, dust seal 434, LCD component 436 are not shown in FIG. 4B and FIG. 4B illustrates operation of actuator amplification apparatus 408 with housing component 438 as a fixed mass and only touchscreen 430 as a moveable mass. However, as described above with respect to FIG. 4, one or more of carrier 432, dust seal 434, LCD component 436 may be coupled to touchscreen 430 and moveable concurrently therewith as a moveable mass. Actuator amplification apparatus 408 includes an actuator mount 416 configured to attach push-pull actuator 402 to housing component 438, a lever component 410 having a lever arm 412 and a fulcrum 414, and an output interface 418 configured to couple lever component 410 to touchscreen 430. Actuator mount 416 is attached to or integrally formed on a floor 437 (see FIG. 4A) of housing component 438, and is configured to receive push-pull actuator 402 therein or thereon to thereby couple push-pull actuator 402 to housing component 438. In this embodiment, push-pull actuator 402 is oriented and configured to move a first end 411 of lever arm 412 in an upward direction along the z-axis as indicated by the directional arrow of force $F_o$. Due to mechanical advantage, lever component 410 transfers and amplifies force $F_o$ provided by push-pull actuator 402 to touchscreen 430. As lever component 410 pivots on fulcrum 414, force $F_o$ applied to first end 411 of lever arm 412 will be amplified or increased at a second end 413 of lever arm 412 to an amplified force $F_A$. Amplified force $F_A$ is then transferred from output interface 418 to touchscreen 430 to cause the required acceleration profile. Notably, in this embodiment, fulcrum 414 is attached to a sidewall 439 (see FIG. 4A) of housing component 438, or another similar portion of housing component 438, to permit pivoting thereof. Further, in this embodiment output interface 418 has a length sufficient to provide clearance of lever arm 412 when first end 411 of lever arm 412 is moved in an upward direction, as shown in phantom in FIG. 4B. Thus, actuator amplification apparatus 408 operates in a similar manner to actuator amplification apparatus 108 except that actuator amplification apparatus 408 is modified to move a touchscreen or haptic touch surface in an up-down manner.

Figure 5:
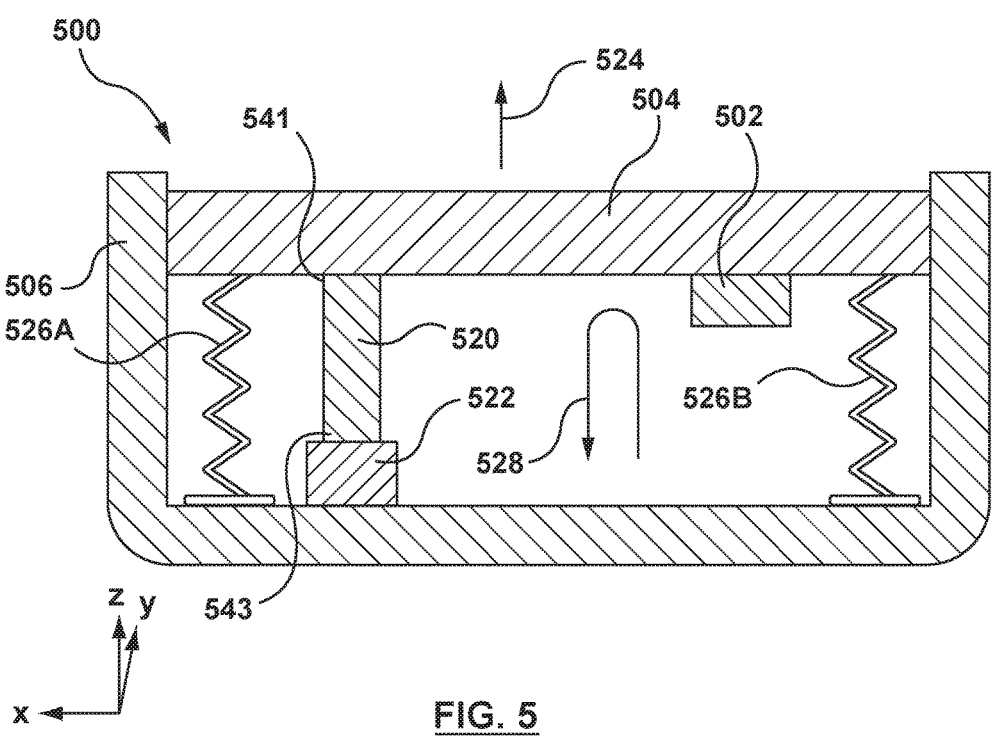
FIG. 5 is a sectional view illustration of a system according to another embodiment hereof, wherein the system includes a material stop configured to dampen a moveable mass when the moveable mass contacts the material stop and the system allows for upward motion of the moveable mass.

In embodiments hereof, it may be desirable to include a braking system or mechanism for damping or decelerating movement of haptic touch surface 104 after application of haptic effects via push-pull actuator 102. FIG. 5 is a sectional view illustration of a system 500 according to another embodiment hereof, wherein system 500 includes a material stop 522 configured to dampen a moveable mass or haptic touch surface 504 when haptic touch surface 504 contacts material stop 522. In the embodiment of FIG. 5, system 500 allows for upward (in the direction of the z-axis) motion or displacement of haptic touch surface 504 as will be described in more detail herein. In this example, haptic touch surface 504 is a touchscreen but in other embodiments haptic touch surface 504 may be a solid mass such as one commonly found in a Linear Resonant Actuator (LRA) or may be any type of haptically excited touch surface or touch element described herein. System 500 includes a fixed mass or housing component 506, haptic touch surface 504 which is coupled to housing component 506 to be moveable relative thereto, an actuator 502 configured to provide a force to move haptic touch surface 504 relative to housing component 506, and material stop 522 coupled to housing component 506. Material stop 522 is a passive braking mechanism that is configured to dampen or decelerate haptic touch surface 504 when haptic touch surface 504 contacts material stop 522. As will be explained in more detail herein, material stop 522 compresses when haptic touch surface 504 contacts the material stop and the compressed material stop exhibits hysteresis to dampen or decelerate haptic touch surface 504.

In addition to the components described above, system 500 may also include one or more suspension elements 526A, 526B that are configured to allow preferential movement of haptic touch surface 504 in a certain direction or along a certain translational axis, such as an z-direction or axis, while limiting movement in other directions or along other translational axis, such as the y-direction or axis and x-direction or axis, when installed within system 500. Suspension elements 526A, 526B are shown as spring elements, but may be a compliant material such as rubber, foam, or flexures as illustrated in U.S. Pat. Appl. Pub. No. 2008/0111788 A1 to Rosenberg et al., herein incorporated by reference in its entirety, and U.S. Pat. Appl. Pub. No. 2010/0245254 A1 to Olien et al, herein incorporated by reference in its entirety. Suspension elements 526A, 526B may also include compliant grommets as illustrated in U.S. Pat. No. 8,629,954 to Olien et al, herein incorporated by reference in its entirety, or may be a dual-stiffness suspension system as illustrated in U.S. Pat. No. 9,213,409 to Redelsheimer et al, herein incorporated by reference in its entirety. In the embodiment of FIG. 5, suspension elements 526A, 526B couple haptic touch surface 504 to housing component 506 of system 500 and allow haptic touch surface 504 to be moved along the z-axis.

In the embodiment of FIG. 5, actuator 502 is shown coupled to the underside of haptic touch surface 504 and serves to output a small pulse, vibration, or texture sensation onto haptic touch surface 504 and to the user if the user is contacting haptic touch surface 504. Although actuator 502 is shown coupled to the underside of haptic touch surface 504, it will be apparent to one of ordinary skill in the art that the location of actuator 502 may vary depending upon application and the type of actuator utilized in system 500. It is shown coupled to haptic touch surface 504 to represent that it is configured to provide a force to move haptic touch surface 504 relative to housing component 506. Actuator 502 may be push-pull actuator 102 described above, in which case it would be physically coupled to housing component 506, and may utilize actuator amplification apparatus 108 for amplifying a force provided or output by the actuator to haptic touch surface 504. In the embodiment of FIG. 5, as described below in more detail, actuator 502 moves haptic touch surface 504 in an upward direction along the z-axis as indicated by a directional arrow 524. As such, when actuator amplification apparatus 108 is utilized in the embodiment of FIG. 5, the orientation of actuator amplification apparatus 108 is modified so as to amplify a force provided or output by the actuator in an upward and/or downward direction as described above with respect to FIGS. 4A and 4B. In addition, the passive braking mechanism provided by material stop 522 may also be utilized with other haptic actuators and thus in another embodiment hereof actuator 502 may also be a number of known actuator types including, without limitation, a linear moveable mass actuator, an inertial actuator that has a moveable mass, piezo actuator, voice coil actuator, an eccentric mass actuator, an E-core type actuator, a moving magnet actuator, or other type of actuator as desired.

Haptic touch surface 504 includes a spacer 520 coupled to the underside thereof. Spacer 520 is coupled to the underside of haptic touch surface 504 such that it moves concurrently therewith, and as used herein, spacer 520 when present is to be considered an integrated component or extension of haptic touch surface 504. Stated another way, haptic touch surface 504 and spacer 520 are collectively a moveable mass. In the embodiment shown in FIG. 5, spacer 520 is used to prevent any downward movement of haptic touch surface 504 and as such spacer 520 has a length such that a free or unattached end 543 thereof is placed proximate to or abutting against material stop 522. Thus, an opposing or attached end 541 of spacer 520 is coupled to haptic touch surface 504 and unattached end 543 of spacer 520 abuts against material stop 522 but is not coupled thereto. In other embodiments (not shown), spacer 520 may be omitted or may have a shorter length such that there exists a gap between unattached end 543 of spacer 520 and material stop 522 if permitting some downward movement of haptic touch surface 504 is desired. Material stop 522 is coupled to housing component 506 such that material stop 522 is effectively fixed or grounded relative to housing component 506. In the embodiment of FIG. 5, material stop 522 is coupled to the floor of housing component 506. Material stop 522 may be coupled to housing component 506 with adhesive, or other mounting methods may be used such as but not limited to a clip.

Haptic touch surface 504 is configured to have oscillatory motion, with zero or more cycles, to provide haptic effects. When actuator 502 provides a force to move haptic touch surface 504 relative to housing component 506, haptic touch surface 504 moves in an upward direction along the z-axis as indicated by directional arrow 524. Stated another way, haptic touch surface 504 is actuated so as to move in the direction of directional arrow 524, away from material stop 522. Suspension elements 526A, 526B are configured to allow preferential movement of haptic touch surface 504 along the z-direction or axis, while limiting movement in the y-direction or axis and x-direction or axis. As haptic touch surface 504 reaches its peak, haptic touch surface 504 will then return and move in an opposing direction, towards material stop 522. Stated another way, after moving in an upward direction along the z-axis, haptic touch surface 504 resonates and moves in a downward direction along the z-axis as indicated by a directional arrow 528. When haptic touch surface 504 is moving in the direction of directional arrow 528, towards housing component 506, spacer 520 of haptic touch surface 504 collides and subsequently compresses material stop 522. Material stop 522 is made from an elastomer or rubber material that passively engages braking through hysteresis at the end of a haptic effect. This results in a deceleration of haptic touch surface 504 as material stop 522 absorbs the energy from haptic touch surface 504 and removes it from haptic touch surface 504. The collision between haptic touch surface 504 and material stop 522 decelerates haptic touch surface 504 as a result to rest (continual zero velocity) due to the compressed material exhibiting hysteresis, and the energy of haptic touch surface 504 is removed from the system. Haptic touch surface 504 will come to rest if the applied haptic effect has ended (i.e., if actuator 502 has stopped actuating or moving haptic touch surface 504). This energy may be felt as a strong collision effect to housing component 506 or may be completely absorbed by material stop 522 and not noticeable to housing component 506. Material stop 522 may be formed from an elastomeric material that is able to absorb and remove energy efficiently such as without limitation silicone rubber, natural rubber and a thermoplastic elastomer (TPE). In another embodiment hereof, material stop 522 is formed from a smart material.

Material stop 522 allows a weaker actuator to be used in system 500 because the initial travel away from material stop 522 is not opposed. Another benefit is that material stop 522 is a passive braking mechanism and thus does not need any input from actuator 502 to stop or actively brake haptic touch surface 504. Active braking requires a reverse signal from actuator 502, while passive braking mechanisms reduces the amount of processing, calculation and power needed to cause a moveable mass to brake. Material stop 522 also allows for no limitations in relation to braking force because material stop 522 is able to generate the requisite return force necessary for braking based off the force applied to it from haptic touch surface 504 upon impact.

Figure 6A:
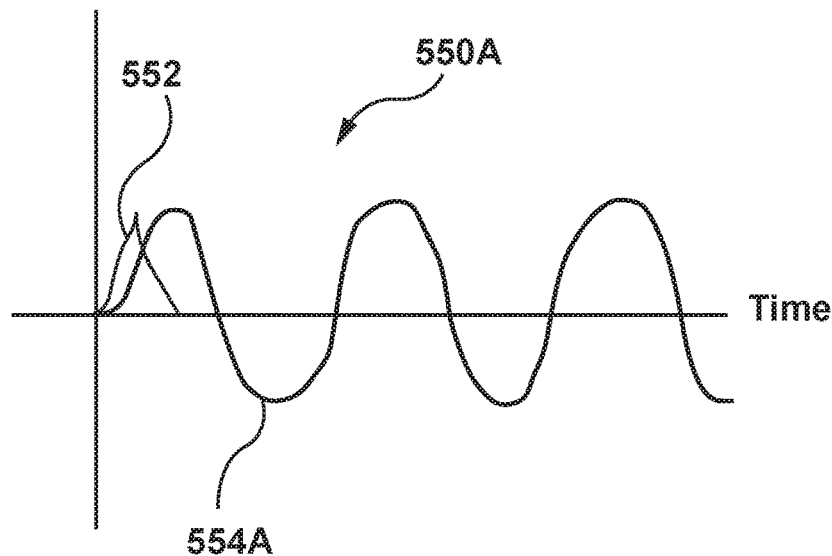
FIG. 6A is a graphical illustration of a haptic effect applied to a system without the material stop of FIG. 5.
Figure 6B:
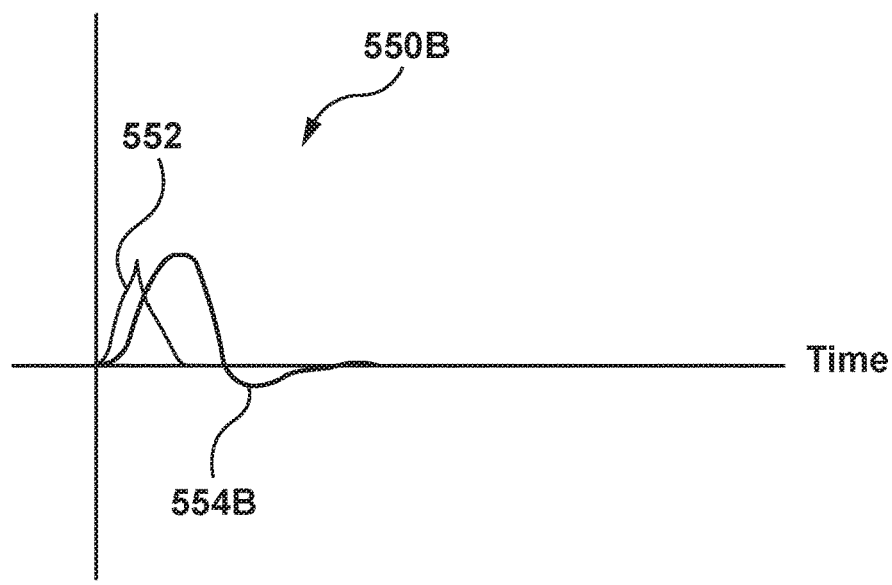
FIG. 6B is a graphical illustration of a haptic effect applied to the system FIG. 5 with the material stop.

The operation of material stop 522 is illustrated via a comparison between FIGS. 6A and 6B. FIG. 6A is a graphical illustration 550A of a haptic effect applied to a system without material stop 522, and FIG. 6B is a graphical illustration 550B of a haptic effect applied to system 500 having material stop 522. In both FIGS. 6A and 6B, an applied haptic effect is represented by a pulse 552. Waveform 554A illustrates the resulting movement or displacement of a haptic touch surface in a system without material stop 522. Without material stop 522 to apply dampening thereof, the haptic effect represented by pulse 552 causes a haptic touch surface to vibrate continually. When there is no braking mechanism, the movable mass or haptic touch surface will keep oscillating and thus create unwanted haptic effects and mass movement after a force is applied to it. The haptic touch surface will eventually slowdown from natural energy loss, such as friction, but the haptic touch surface may still continue to move for an elongated period of time and thus produce unwanted haptic effects.

However, as shown in FIG. 6B, the haptic effect represented by pulse 552 can be stopped by impacting material stop 522. Waveform 554B illustrates the resulting movement or displacement of haptic touch surface 504 in system 500 having material stop 522. By deflecting material stop 522 a small distance in the micrometer range, energy from the system is dissipated causing the movement of haptic touch surface 504 to stop. Energy is dissipated through the damping and hysteresis properties of material stop 522 in that the energy put into material stop 522 by deflecting it is converted to heating material stop 522, and thus the energy from material stop 522 is not returned to haptic touch surface 504. Haptic touch surface 504 will collide with material stop 522 and the oscillation thereof will stop either completely or near completely such that haptic touch surface 504 will come to rest with as little movement as required after initial impact into material stop 522. Material stop 522 ensures that unnecessary movements or unwanted effects are not output.

Figure 7:
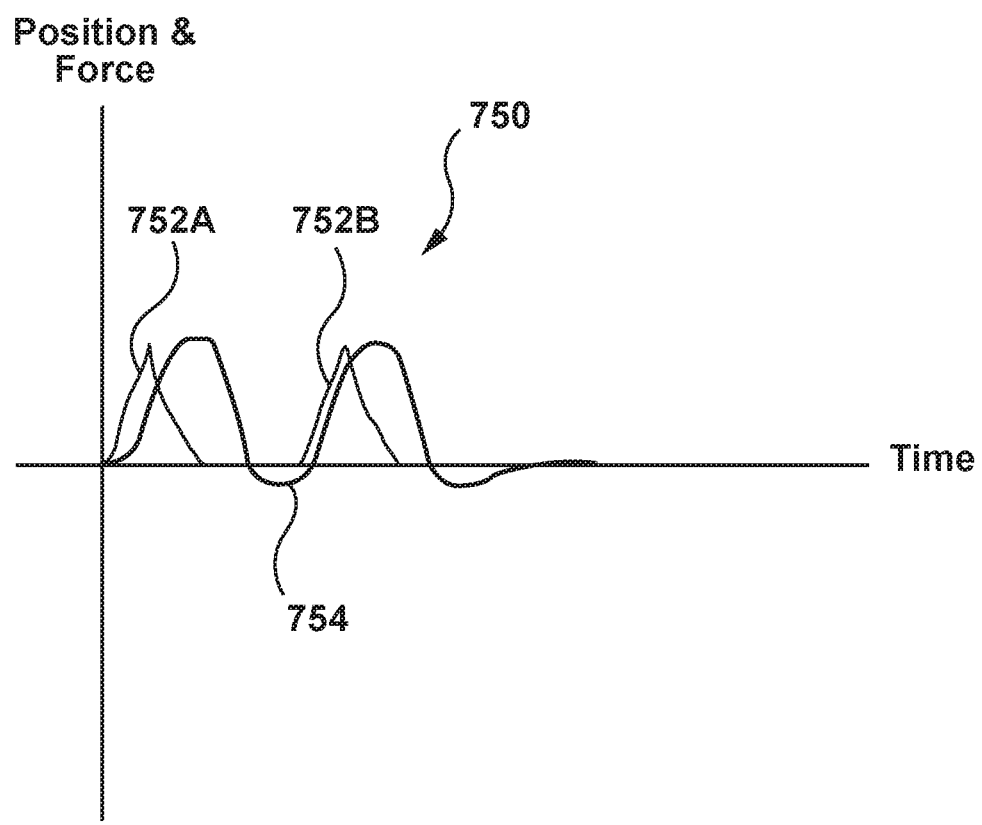
FIG. 7 is a graphical illustration of two haptic effects applied sequentially to the system FIG. 5 with the material stop.

In some cases, oscillation of haptic touch surface 504 may still be desired in order to convey a particular effect. Oscillation of haptic touch surface 504 may still be achieved despite the presence of material stop 522. More particularly, FIG. 7 is a graphical illustration 750 of two haptic effects applied sequentially to system 500 having material stop 522. The two haptic effects applied sequentially are represented by pulses 752A, 752B, and waveform 754 illustrates the resulting movement or displacement of haptic touch surface 504 in system 500 having material stop 522. Second pulse 752B is in phase with the vibrations of haptic touch surface 504. Application of two or more sequential pulses from actuator 502 result in oscillation of haptic touch surface 504, and such oscillation may be a larger effect such as a click, pop, bump, or grain effect. Thus, even with material stop 522 present, oscillation of haptic touch surface 504 may be produced by applying two or more pulses to haptic touch surface 504.

Figure 8:
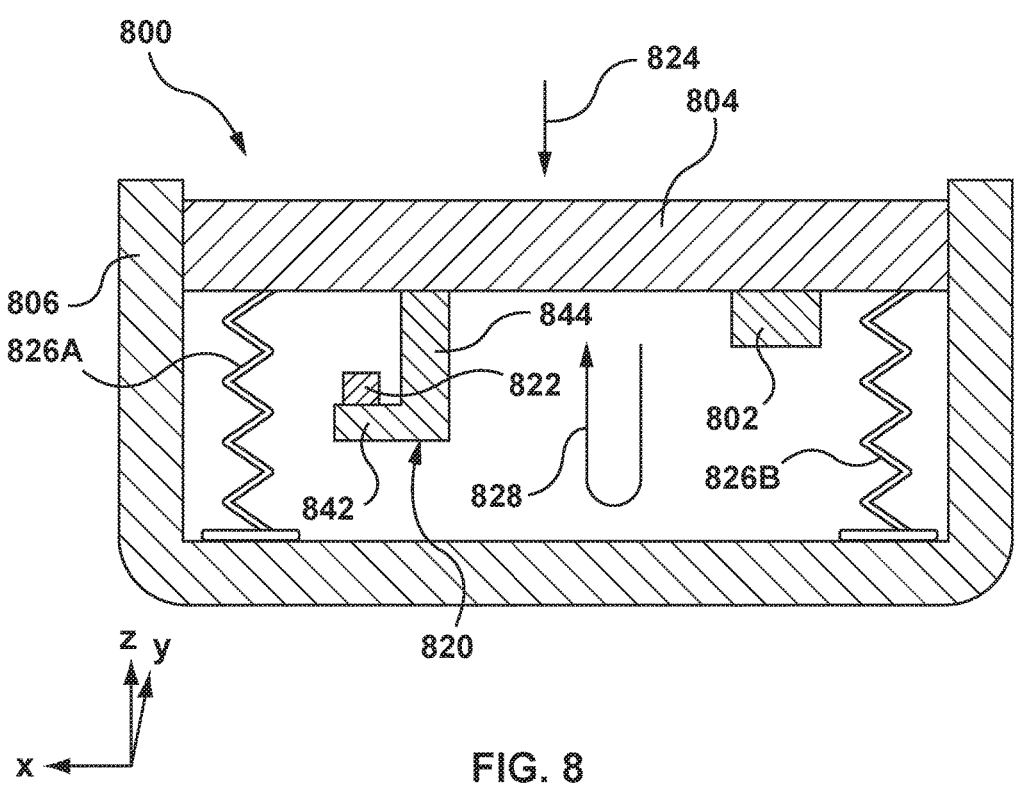
FIG. 8 is a sectional view illustration of a system according to another embodiment hereof, wherein the system includes a material stop configured to dampen a moveable mass when the moveable mass contacts the material stop and the system allows for downward motion of the moveable mass.

The configuration or disposition of the material stop may vary from that shown in FIG. 5 depending upon the desired preferential movement of the haptic touch surface. FIG. 8 is a sectional view illustration of a system 800 that includes a material stop 822 configured to dampen a haptic touch surface 804 when haptic touch surface 804 contacts material stop 822. In the embodiment of FIG. 8, system 800 allows for downward motion or displacement of haptic touch surface 804 rather than upward motion allowed in system 500. More particularly, system 800 includes a fixed mass or housing component 806, haptic touch surface 804 which is coupled to housing component 806 to be moveable relative thereto, an actuator 802 coupled to haptic touch surface 804 and configured to provide a force to move the haptic touch surface relative to housing component 806, and material stop 822 coupled to housing component 806. Material stop 822 is coupled to housing component 806 such that material stop 822 is effectively fixed or grounded relative to housing component 806. In the embodiment of FIG. 8, material stop 822 may be coupled to a sidewall (not shown) or other similar portion of housing component 806. Material stop 822 may be coupled to housing component 806 with adhesive, or other mounting methods may be used such as but not limited to a clip. In addition, system 800 may also include one or more suspension elements 826A, 826B that are configured to allow preferential movement of haptic touch surface 804 in a certain direction or along a certain translational axis, such as an z-direction or axis, while limiting movement in other directions or along other translational axis, such as the y-direction or axis and x-direction or axis, when installed within system 800. Similar to material stop 522 described above, material stop 822 is a passive braking mechanism that is configured to dampen or decelerate haptic touch surface 804 when haptic touch surface 804 contacts material stop 822. Material stop 822 compresses when haptic touch surface 804 contacts material stop 822 and the compressed material stop exhibits hysteresis to dampen or decelerate haptic touch surface 804.

When actuator 802 provides a force to move haptic touch surface 804 relative to housing component 806, haptic touch surface 804 moves in a downward direction along the z-axis as indicated by a directional arrow 824. Stated another way, haptic touch surface 804 is actuated so as to move in the direction of directional arrow 824. In this embodiment, the downward force applied from actuator 802 will move haptic touch surface 804 towards material stop 822 without colliding with it. As haptic touch surface 804 reaches its peak, haptic touch surface 804 will then return and move in an opposing direction. Stated another way, after moving in a downward direction along the z-axis, haptic touch surface 804 resonates and moves in an upward direction along the z-axis as indicated by a directional arrow 828. In order to have haptic touch surface 804 collide with material stop 822 to activate the passive braking during the return stroke (i.e., when moving upward as indicated by directional arrow 828), haptic touch surface 804 includes an L-shaped spacer 820 coupled thereto. L-shaped spacer 820 is coupled to the underside of haptic touch surface 804 such that it moves concurrently therewith, and as used herein, L-shaped spacer 820 when present is to be considered an integrated component or extension of haptic touch surface 804. Stated another way, haptic touch surface 804 and L-shaped spacer 820 are collectively a moveable mass. L-shaped spacer 820 includes a stem 844 and a base 842. When haptic touch surface 804 travels upward, base 842 of L-shaped spacer 820 collides with material stop 822 and subsequently compresses material stop 822 to dampen system 800 and provide passive braking to haptic touch surface 804.

Figure 9:
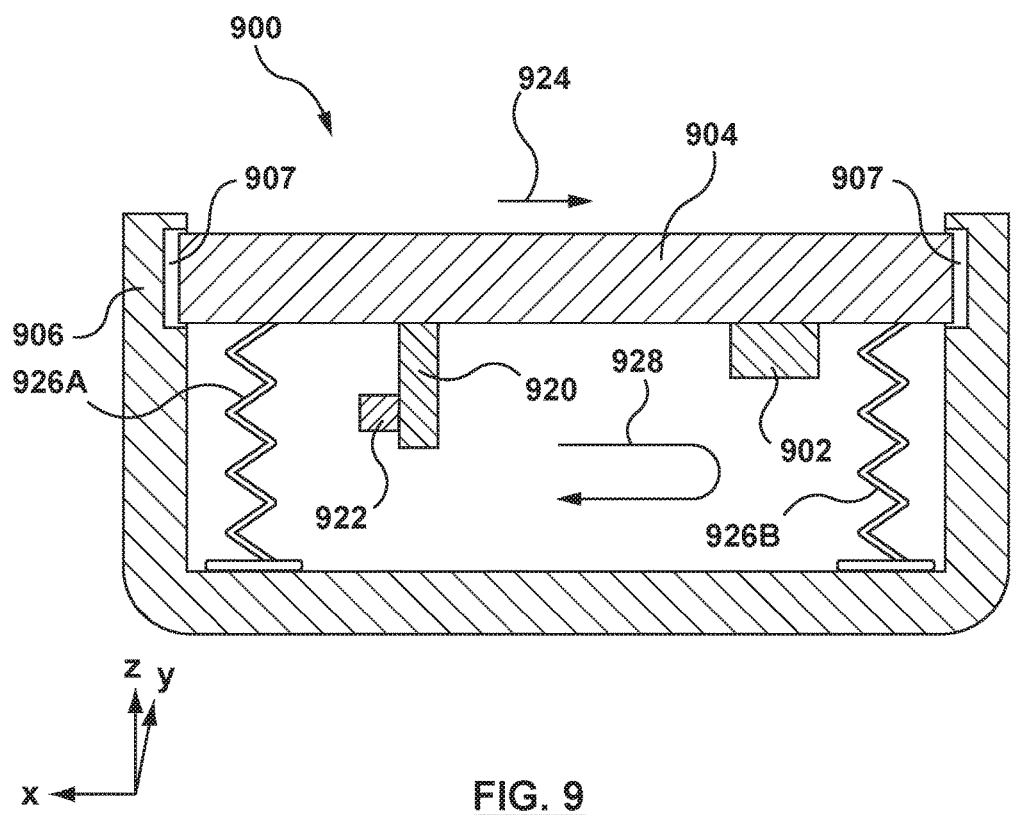
FIG. 9 is a sectional view illustration of a system according to another embodiment hereof, wherein the system includes a material stop configured to dampen a moveable mass when the moveable mass contacts the material stop and the system allows for lateral motion of the moveable mass.

FIG. 9 is a sectional view illustration of a system 900 that includes a material stop 922 configured to dampen a haptic touch surface 904 when haptic touch surface 904 contacts material stop 922. In the embodiment of FIG. 9, system 900 allows for lateral motion or displacement of haptic touch surface 904 rather than upward, downward motion allowed in systems 500, 800, respectively. More particularly, system 900 includes a fixed mass or housing component 906, haptic touch surface 904 which is coupled to housing component 906 to be moveable relative thereto, an actuator 902 coupled to haptic touch surface 904 and configured to provide a force to move the haptic touch surface relative to housing component 906, and material stop 922 coupled to housing component 906. Material stop 922 is coupled to housing component 906 such that material stop 922 is effectively fixed or grounded relative to housing component 906. In the embodiment of FIG. 9, material stop 922 may be coupled to a sidewall (not shown) or other similar portion of housing component 906. Material stop 922 may be coupled to housing component 906 with adhesive, or other mounting methods may be used such as but not limited to a clip. In addition, system 900 may also include one or more suspension elements 926A, 926B that are configured to allow preferential movement of haptic touch surface 904 in a certain direction or along a certain translational axis, such as an x-direction or axis, while limiting movement in other directions or along other translational axis, such as the y-direction or axis and z-direction or axis, when installed within system 900. Suspension elements 926A, 926B are shown as spring elements, which may be formed from a different material than suspension elements 526A, 526B in order to configure suspension elements 926A, 926B to allow movement in the x-direction or axis while limiting movement in the y-direction or axis and z-direction or axis. Alternatively, as will be understood by one of ordinary skill in the art, suspension elements 926A, 926B may be formed with a different pitch in order to selectively allow movement in the x-direction or axis while limiting movement in the y-direction or axis and z-direction or axis, and/or suspension elements 926A, 926B may be formed from a compliant grommet or a compliant material such as rubber, foam, or flexures as described above in order to selectively allow movement in the x-direction or axis while limiting movement in the y-direction or axis and z-direction or axis. In this embodiment, housing component 906 includes opposing grooves or channels 907 formed therein to permit lateral or side-to-side movement of haptic touch surface 904. Similar to material stop 522 described above, material stop 922 is a passive braking mechanism that is configured to dampen or decelerate haptic touch surface 904 when haptic touch surface 904 contacts material stop 922. Material stop 922 compresses when haptic touch surface 904 contacts material stop 922 and the compressed material stop exhibits hysteresis to dampen or decelerate haptic touch surface 904.

In this embodiment, the forces produced or output by actuator 902 onto haptic touch surface 904 are linear and along the x-axis, parallel to the planar surface of haptic touch surface 904. When actuator 902 provides a force to move haptic touch surface 904 relative to housing component 906, haptic touch surface 904 moves in lateral, right direction along the x-axis as indicated by a directional arrow 924. Stated another way, haptic touch surface 904 is actuated so as to move in the direction of directional arrow 924, away from material stop 922. As haptic touch surface 904 reaches its peak, haptic touch surface 904 will then return and move in an opposing direction. Stated another way, after moving in a lateral, right direction along the x-axis, haptic touch surface 904 resonates and moves in a lateral, left direction along the x-axis as indicated by a directional arrow 928. In this embodiment, haptic touch surface 904 is moving laterally but material stop 922 lies beneath. In order to have haptic touch surface 904 collide with material stop 922 to activate the passive braking during the return stroke (i.e., when moving lateral, left direction as indicated by directional arrow 928), haptic touch surface 904 includes a spacer 920 coupled thereto. Spacer 920 is coupled to the underside of haptic touch surface 904 such that it moves concurrently therewith, and as used herein, spacer 920 when present is to be considered an integrated component or extension of haptic touch surface 904. Stated another way, haptic touch surface 904 and spacer 920 are collectively a moveable mass. When haptic touch surface 904 travels in the lateral, left direction, spacer 920 collides with material stop 922 and subsequently compresses material stop 922 to dampen system 900 and provide passive braking to haptic touch surface 904.

Although embodiments described above illustrate a material stop for braking in one direction of travel, embodiments hereof may include two or more material stops for passively braking in two or more directions of travel.

Several embodiments are specifically illustrated and/or described herein. However, it will be appreciated that modifications and variations of the disclosed embodiments are covered by the above teachings and within the purview of the appended claims without depending from the spirit and intended scope of the invention. While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A system for amplifying haptic effects provided by a push-pull actuator, the system comprising:
   a push-pull actuator configured to provide a force and a displacement; and
   an actuator amplification apparatus including
      an actuator mount configured to attach the actuator amplification apparatus to a housing component, wherein the push-pull actuator is disposed within the actuator mount,
      a lever component including a lever arm and a fulcrum, the lever arm having a first end coupled to the push-pull actuator to receive the force from the push-pull actuator and a second opposing end coupled to the fulcrum, wherein the lever arm is configured to pivot on the fulcrum upon receiving the force from the push-pull actuator, and
      an output interface coupled to the lever arm and configured to attach the actuator amplification apparatus to a moveable mass,
   wherein the lever component transfers and reduces the displacement provided by the push-pull actuator to the moveable mass and wherein the lever component transfers and amplifies the force provided by the push-pull actuator to the moveable mass.

2. The system of claim 1, wherein the moveable mass weighs between 200 grams and 2000 grams.

3. The system of claim 2, wherein the moveable mass includes a haptic touchscreen.

4. The system of claim 2, wherein the housing component is a dashboard frame of an automobile.

5. The system of claim 1, wherein the output interface is coupled to the lever arm adjacent to the second opposing end of the lever arm.

6. The system of claim 1, wherein the first end of the lever arm is coupled to a plunger of the push-pull actuator and a body of the push-pull actuator is disposed on the actuator mount.

7. The system of claim 1, further comprising:
   a material stop coupled to the housing component, wherein the material stop is configured to dampen the moveable mass when the moveable mass contacts the material stop.

8. The system of claim 7, wherein the material stop compresses when the moveable mass contacts the material stop and the compressed material stop exhibits hysteresis to dampen the moveable mass.

9. The system of claim 8, wherein the material stop is formed from an elastomeric material.

10. The system of claim 8, wherein the material stop is formed from a smart material.

11. A system for amplifying haptic effects provided by a push-pull actuator, the system comprising:
    a housing component;
    a push-pull actuator configured to provide a force and a displacement, wherein the push-pull actuator is coupled to the housing component via an actuator mount;
    a lever component including a lever arm and a fulcrum, the lever arm having a first end coupled to the push-pull actuator to receive the force from the push-pull actuator and a second opposing end coupled to the fulcrum so that the lever arm is configured to pivot on the fulcrum upon receiving the force from the push-pull actuator; and
    a haptic touch surface coupled to the lever arm via an output interface,
    wherein the amount of displacement transferred to the haptic touch surface from the push-pull actuator is reduced by the lever component and wherein the amount of force transferred to the haptic touch surface from the push-pull actuator is increased by the lever component.

12. The system of claim 11, wherein the haptic touch surface weighs between 200 grams and 2000 grams.

13. The system of claim 12, wherein the haptic touch surface is a touchscreen.

14. The system of claim 12, wherein the housing component is a dashboard frame of an automobile.

15. The system of claim 11, wherein the output interface is coupled to the lever arm adjacent to the second opposing end of the lever arm.

16. The system of claim 11, wherein the first end of the lever arm is coupled to a plunger of the push-pull actuator and a body of the push-pull actuator is disposed on the actuator mount.

17. The system of claim 11, further comprising:
    a material stop coupled to the housing component, wherein the material stop is configured to dampen the haptic touch surface when the haptic touch surface contacts the material stop.

18. The system of claim 17, wherein the material stop compresses when the haptic touch surface contacts the material stop and the compressed material stop exhibits hysteresis to dampen the haptic touch surface.

19. The system of claim 17, wherein the haptic touch surface includes a spacer coupled thereto and the spacer contacts the material stop.

\* \* \* \* \*

UNITED STATES PATENT AND TRADEMARK OFFICE
CERTIFICATE OF CORRECTION

PATENT NO.        : 10,152,132 B2
APPLICATION NO.   : 15/424012
DATED             : December 11, 2018
INVENTOR(S)       : Benoit Paul Belley et al.

Page 1 of 1

It is certified that error appears in the above-identified patent and that said Letters Patent is hereby corrected as shown below:

The title: "METHOD AND APPARATUS FOR ENABLING HEAVY FLOATING TOUCHSCREEN HAPTICS ASSEMBLES AND PASSIVE BRAKING SYSTEM" should be replaced with -- METHOD AND APPARATUS FOR ENABLING HEAVY FLOATING TOUCHSCREEN HAPTICS ASSEMBLIES AND PASSIVE BRAKING SYSTEM --.

Signed and Sealed this
Twelfth Day of February, 2019

Andrei Iancu
*Director of the United States Patent and Trademark Office*